US010300491B2

(12) United States Patent
Plumb

(10) Patent No.: US 10,300,491 B2
(45) Date of Patent: May 28, 2019

(54) HAMMER MILL HAMMER WITH GROOVES FOR RECEIVING HARD FACING MATERIAL AND METHOD OF MAKING SAME

(71) Applicant: JACOBS CORPORATION, Harlan, IA (US)

(72) Inventor: Chad J. Plumb, Harlan, IA (US)

(*) Notice: Subject to any disclaimer, the term of this patent is extended or adjusted under 35 U.S.C. 154(b) by 328 days.

(21) Appl. No.: 15/372,771

(22) Filed: Dec. 8, 2016

(65) Prior Publication Data
US 2018/0161778 A1 Jun. 14, 2018

(51) Int. Cl.
*B02C 13/28* (2006.01)

(52) U.S. Cl.
CPC ................... *B02C 13/28* (2013.01)

(58) Field of Classification Search
CPC ..... B02C 13/00; B02C 13/28; B02C 13/2804; B02C 13/2808; B02C 13/2812
See application file for complete search history.

(56) References Cited

U.S. PATENT DOCUMENTS

| 1,760,097 | A | 5/1930 | Williams | |
|---|---|---|---|---|
| 1,827,986 | A | 10/1931 | Iglehart | |
| 1,829,325 | A | 10/1931 | Alfred | |
| 1,954,175 | A | 4/1934 | Jensen | |
| 2,237,510 | A | 4/1941 | Tankersley | |
| 2,647,695 | A | 8/1953 | Rogers | |
| 2,763,439 | A | 9/1956 | Mankoff | |
| 3,045,934 | A * | 7/1962 | Eilers | B02C 13/28 241/197 |
| 3,482,789 | A | 12/1969 | Newell | |
| 4,129,262 | A | 12/1978 | Lowry | |
| 4,856,170 | A | 8/1989 | Kachik | |
| 6,419,173 | B2 | 7/2002 | Balvanz | |
| 7,140,569 | B2 | 11/2006 | Young | |
| 7,419,109 | B1 | 9/2008 | Ronfeldt | |
| 7,712,692 | B2 * | 5/2010 | Hall | B02C 13/09 241/197 |
| 8,033,490 | B1 | 10/2011 | Young | |
| 8,104,177 | B2 | 1/2012 | Plumb | |
| 2005/0150987 | A1 * | 7/2005 | Hur | B02C 13/1835 241/275 |
| 2015/0314298 | A1 * | 11/2015 | Porter | B02C 13/04 241/197 |

* cited by examiner

Primary Examiner — Matthew Katcoff

(57) ABSTRACT

An improved hammer mill hammer constructed by forming a groove in an edge of the grinding end of a hammer for receiving hard facing material and placing hard facing in the groove.

6 Claims, 3 Drawing Sheets

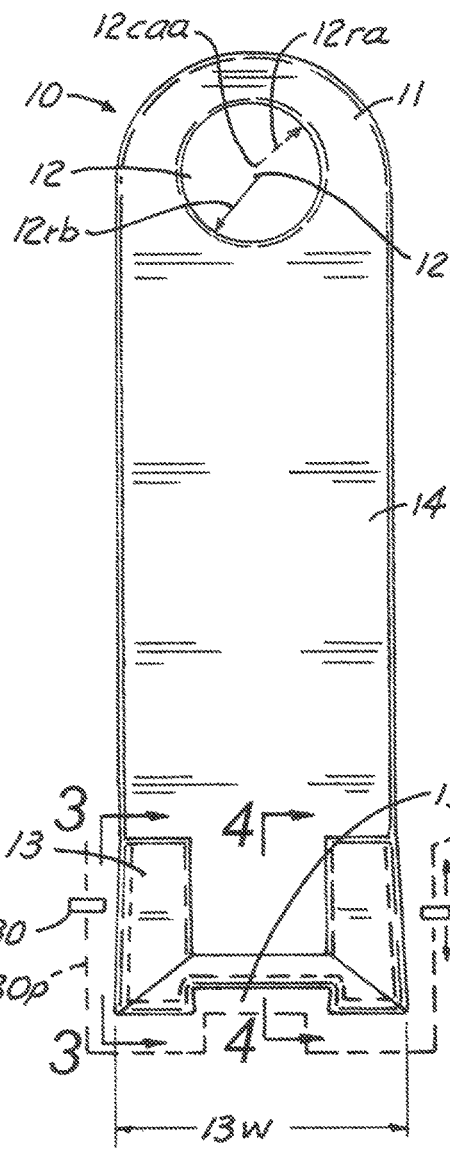
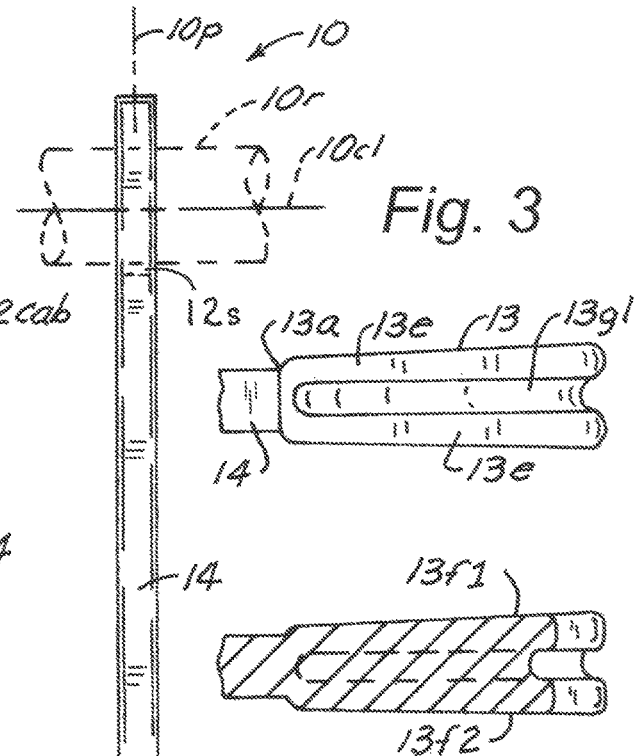
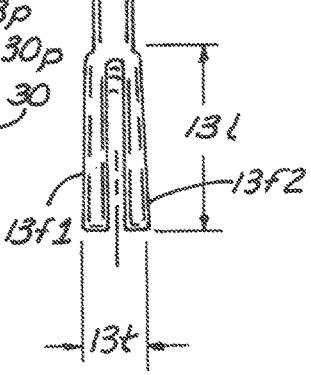
Fig. 1   Fig. 2   Fig. 3   Fig. 4

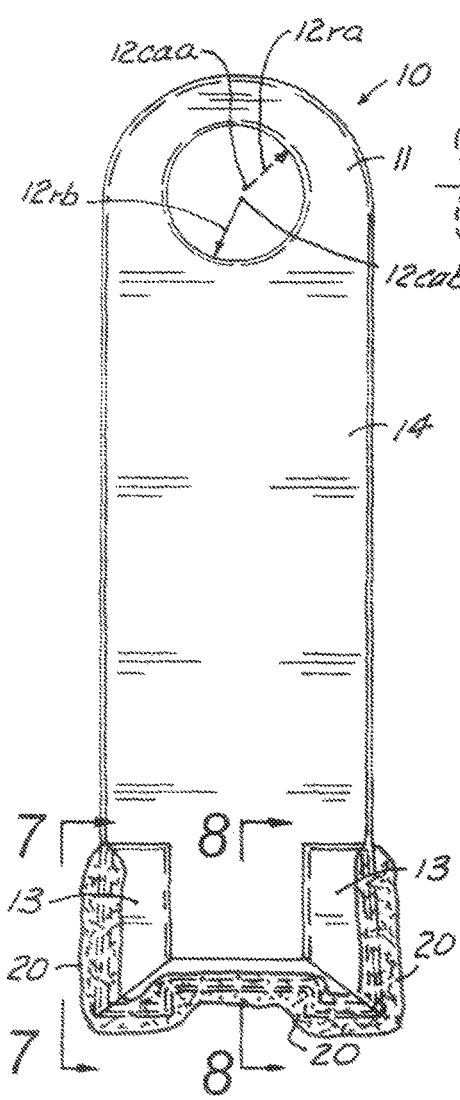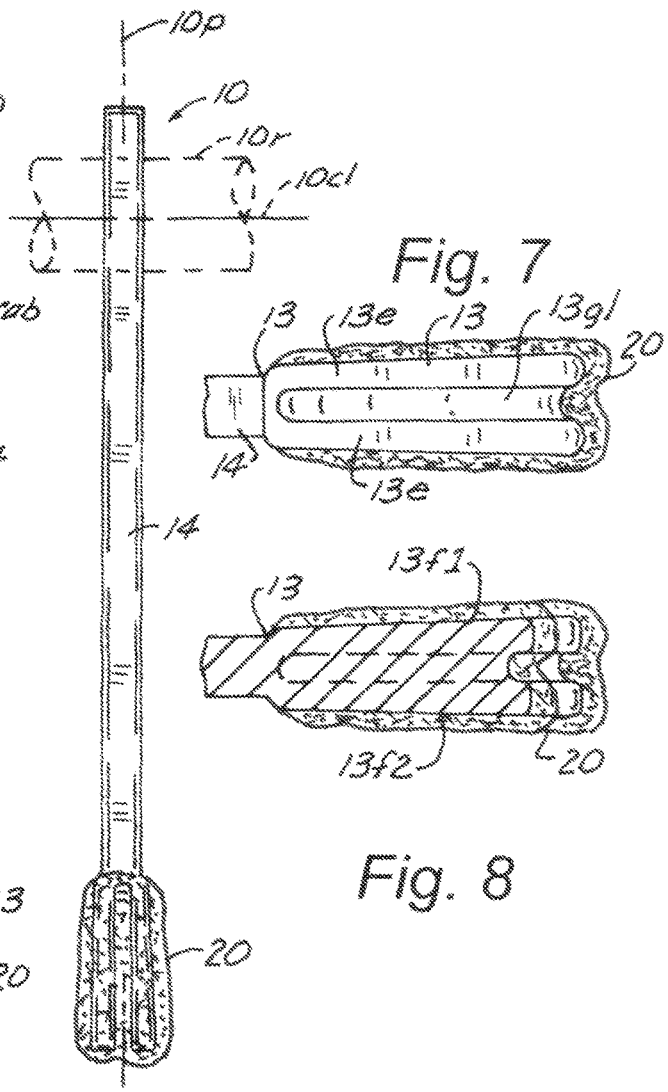
Fig. 5  Fig. 6
Fig. 7
Fig. 8

HAMMER MILL HAMMER WITH GROOVES FOR RECEIVING HARD FACING MATERIAL AND METHOD OF MAKING SAME

CROSS REFERENCE TO RELATED APPLICATIONS

The present application claims priority to U.S. patent application Ser. No. 15/093,199 to Chad Plumb, filed Apr. 7, 2016 and is incorporated herein by reference in its entirety.

FIELD OF THE INVENTION

The present invention relates to an improved hammer mill hammer and a method of making it. More particularly, this invention relates to forming a groove in an edge of the grinding end of a hammer for receiving hard facing material and placing hard facing in the groove.

BACKGROUND AND DESCRIPTION OF RELATED PRIOR ART

Hammer mills have long been used for grinding or comminution of various materials. A typical hammer mill comprises a rotor assembly mounted on a rotor shaft inside a housing. A rotor assembly 1100 is illustrated at rest in FIGS. 11 and 13 of Plumb et al. U.S. Pat. No. 8,104,177. A material inlet is generally located at the top of the housing with one or more material outlets located near the bottom of the housing. As shown in FIGS. 11 to 13 of the Plumb et al. '177 Patent, the rotor assembly 1100 includes a drive shaft and rows of hammers 1400, as illustrated in FIG. 14 of the Plumb et al. '177 Patent. The hammers 1400 are pivotally connected to the rotor 1100 by a of a steel hammer rod or pin. The hammers are normally flat steel blades or bars, as illustrated in FIGS. 11 to 14. The hammers extend out substantially radially from the hammer rods due to inertia when the hammer mill is (rotating) in operation, as illustrated in FIG. 12. The rotor assembly 1100 is mounted inside a housing, known by those skilled in the hammer art as a grinding or working chamber. In a reversible hammer mill, this grinding chamber comprises a cutting plate mounted on either side of the material inlet.

Present-day cutting plates comprise an upper, linear section, and do not allow particles to escape. Downstream of the cutting plate, the interior of the working chamber is defined by curved screen plates. The screen opening diameter is selected to match the desired final particle size of the material being comminuted. Particles less than or equal to the desired size exit the chamber though the screens, while material greater than the desired size are further reduced by the rotating hammers.

Standard hammers, when grinding or comminuting materials, impact the product to be pulverized to create a smaller size particle. This impact forces material against a perforated screen area and cuts and sizes the product. Inside the typical hammer mill, numerous forces act. Forces exist at the contact end of the hammer, where the hammer impacts the material being comminuted and that is why many prior art hammers have hard facing welded to the contact end for reasons such as reducing wear on the contact end. Sometimes adding hard facing makes the grinding end of the hammer too large, causing the hammer mill to use more than an optimum amount of horse power to run it.

The Plumb et al. U.S. Pat. No. 8,104,177 also show a providing hard facing such as hardened material 22 added to edge portions of the contact end of the hammer, preferably by welding, to increase hammer life. See also Newell, U.S. Pat. No. 3,482,789 (lines 12 to 18 of column 4); Kachik, U.S. Pat. No. 4,856,170 (lines 55 to 68 of column 8); and, Lowry U.S. Pat. No. 4,129,262. Welding of tungsten carbide onto the contact surfaces of hammers is well known in the art, as illustrated in the Young U.S. Pat. No. 7,140,569 (lines 9 to 17 of column 3); Young, U.S. Pat. No. 8,033,490 (lines 28 to 36 of column 9); Balvanz, U.S. Pat. No. 6,419,173 (lines 11 to 16 of column 3); Rogers, U.S. Pat. No. 2,647,695 (lines 37 to 41 of column 2); Mankoff, U.S. Pat. No. 2,763,439 (lines 26 to 31 of column 1); and, Eilers, U.S. Pat. No. 3,045,934 (lines 44 to 54 of column 2). Hammers produced by Jacobs Corporation, as illustrated in Ronfeldt et al., U.S. Pat. No. 7,419,109, included hardened material, such as tungsten carbide, welded on the contact edges of hammer mill hammers. It happens sometimes that hard facing separates from the hammer, which at best will only cause increased wear on the hammer and at worst will allow a loose piece of hard facing to be present in the material being comminuted.

Some prior art patents show grooves or notches in the grinding end of the hammer. See, for example, Williams, U.S. Pat. No. 1,760,097; Iglehart, U.S. Pat. No. 1,827,986; Alfred, U.S. Pat. No. 1,829,325; and, Jensen, U.S. Pat. No. 1,954,175. Tankersley, U.S. Pat. No. 2,237,510, shows grooves in the sides of a hammer extending from the contact end toward the connection end. All of the prior art patents referred to in this document are hereby incorporated by reference herein in their entirety.

BRIEF SUMMARY OF THE INVENTION

The present invention relates to solving the aforementioned problems in the prior art that sometimes hard facing separates from a hammer mill hammer, the problems being at least partially solved by forming a groove in an edge of the grinding end of a hammer for receiving hard facing material and placing hard facing in the groove.

BRIEF DESCRIPTION OF THE DRAWINGS

The above identified problem is at least partially solved through provision of the method and apparatus described in the following detailed description, particularly when studied in conjunction with the drawings, wherein:

FIG. 1 is a front elevational view of a hammer constructed in accordance with the present invention before hard facing is attached thereto;

FIG. 2 is a side elevational view of the hammer of FIG. 1;

FIG. 3 is an enlarged side elevational view of the grinding end taken along line 3-3 of FIG. 1;

FIG. 4 is a cross sectional view of the grinding end taken along line 4-4 of FIG. 1;

FIG. 5 is a front elevational view like FIG. 1 but having hard facing attached in the grooves and around the edges of the grinding end of the hammer;

FIG. 6 is a side elevational view of the hammer of FIG. 5;

FIG. 7 is an enlarged side elevational view of the grinding end taken along line 7-7 of FIG. 5;

FIG. 8 is a cross sectional view of the grinding end taken along line 8-8 of FIG. 5;

DETAILED DESCRIPTION OF THE INVENTION

Figure 9:
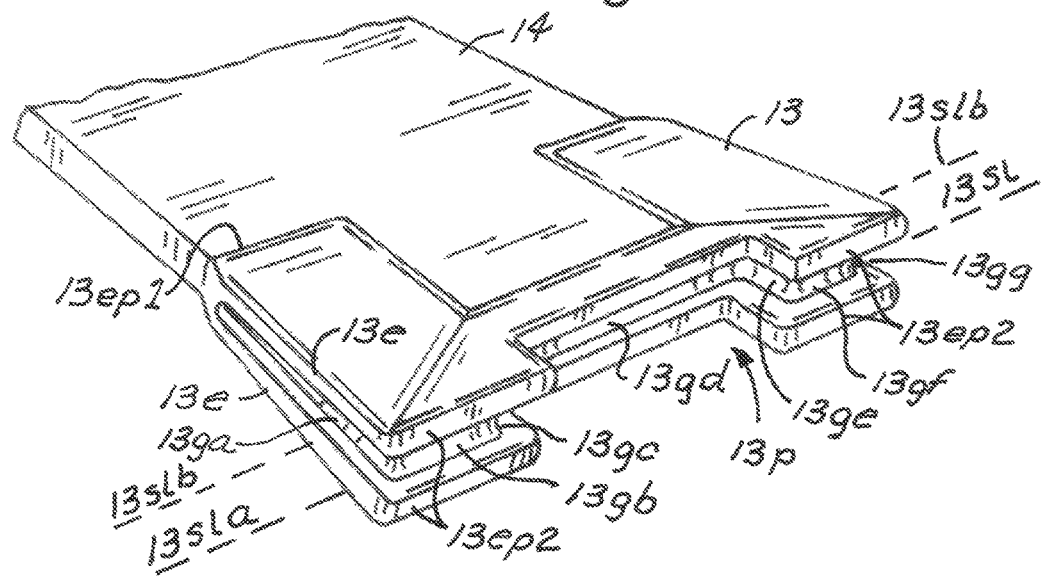
FIG. 9 is an enlarged perspective view of the hammer as shown in FIGS. 1-4 before hard facing is attached thereto.

Referring to the drawing, wherein like reference numerals designate identical or corresponding parts throughout the several figures, FIG. 1.

Figure 10:
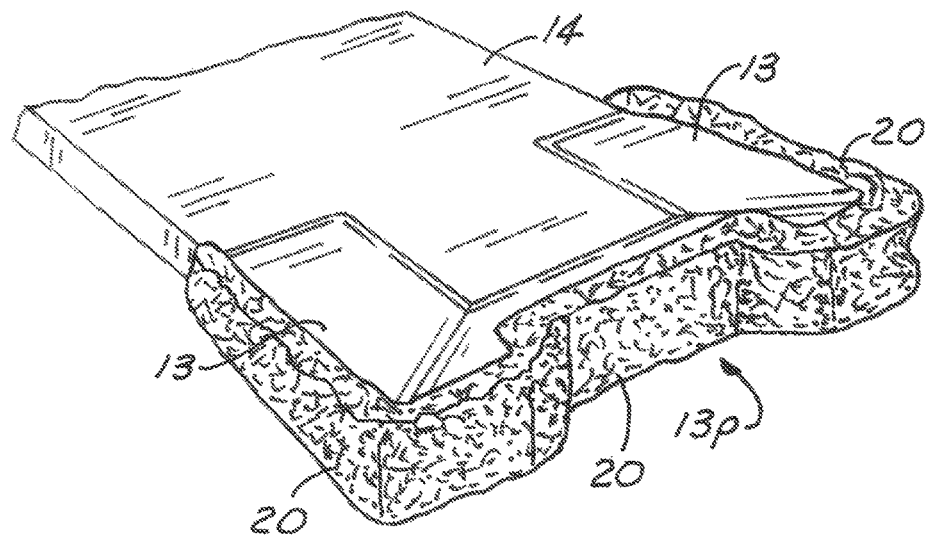
FIG. 10 is an enlarged perspective view of the hammer as shown in FIGS. 5-8 after hard facing is attached thereto.

FIGS. 1-4 and 9 show a blank hammer before hard facing is attached as shown in FIGS. 5-8 and 10.

Referring now specifically to FIGS. 1-4, a hammer (10) is shown with a rod hole end (11) having a rod hole (12) disposed therein. The rod hole (12) is configured to engage said hammer (10) with a hammer mill rod (10r). A grinding end (13) is spaced from the rod hole end (11) along a length of said hammer (10). The grinding end (13) has a length (131) (FIG. 2), a width (13w) (FIG. 1), and a thickness (13t) defined between a first face (13f1) (FIG. 4). The grinding end (13) also has a second face (13f2) with an edge (13e) (FIG. 3) disposed between the first face (13f1) and the second face (13f2).

A neck (14) connects the rod hole end (11) and said grinding end (13). The grinding end (13) is disposed in a plane (10p) (FIG. 2), the plane (10p) being between the first face (13f1) and the second face (13f2) of the grinding end (13). The plane (10p) also intersects the edge (13e) of the grinding end (13).

A groove (13gl) is formed in the edge (13e) for receiving hard facing material (20). Hard facing (20) disposed in the groove (13gl), preferably my moving a welder (30), along a path (30p) shown in dashed lines in FIG. 1. Adding multiple thin layers of hard facing (20), each layer extending over the last layer added, such as welding with a material that includes tungsten carbide, rather than just one big thick layer of hard facing, has been found to make the bond between the grinding end (13) of the hammer and the welded hard facing much stronger. This is in addition to the fact that placing the hard facing in a groove (13gl) also holds the welded hard facing (20) to the grinding end (13) much better than when applied to a grinding end that does not have a groove in it. The method of applying hard facing (20) in its most basic form is applying a first layer of hard facing (20) in the groove (13gl) and then applying a second layer of hard facing (20) over the first layer of hard facing. Additional layers can be added over the last layer applied by a welder (30) passing redundantly along a path (30p) as shown in FIG. 1.

Looking again at FIG. 1, it is noted that the rod hole is elliptical, with the top arc of the elliptical hole 12 being formed by a radial arc (12ra) rotated about a point (12caa). Similarly, the bottom arc of the elliptical hole 12 is formed by a radial arc (12rb) rotated about a point (12cab). Other configurations of the rod hole can be used, for example in the shapes disclosed for co-pending U.S. patent application Ser. No. 15/093,199 to Chad Plumb, filed Apr. 7, 2016.

FIG. 2 shows a hammer mill rod (10r) in dashed line, the hammer mill rod (10r) having a centerline (10cl). When the hammer (10) is hanging in the position shown in FIG. 2 and most of the time when the hammer mill is in operation, the rod (10r) will be in contact with the arc formed by radial arc (12ra) shown in FIG. 1, leaving a space between the rod (10r) and the lower part of the rod hole formed by the lower radial arc (12rb) as shown in FIG. 1. This space (12s) (FIG. 2) between the rod and the rod hole prevents the buildup of material between the rod (10r) and the rod hole (12) and also makes it easier to remove the hammer (10) when desired.

The grinding end (13) of the hammer (10) is connected to the neck (14) at one end place (13ep1) (FIG. 9) of the length (131) of the grinding end (13), that one end place (13ep1) being a connected to the neck end. The other end place (13ep2) being a free end spaced from the neck (14).

The edge (13e) of the grinding end (13) extends at least partially along the length (131) of the grinding end (13), on at least one side of the grinding end (13) and the groove is disposed in the edge (13e) of the grinding end (13) that extends at least partially along the length (131) of the grinding end (13).

The edge (13e) of the grinding end (13) also, optionally, extends at least partially along the width (13w) of the grinding end (13), at the other end place (13ep2), which is the free end spaced from the neck (14). The groove part (13gl) is disposed in the edge (13e) of the grinding end (13) that extends (13ga, 13gb, 13gd, 13ge, 13gf, 13gg) at least partially along the width (13w) of the grinding end (13).

The edge (13e) of the grinding end (13) extends completely across and along the width (13w) of the grinding end (13) and the groove (13ga, 13gb, 13gd, 13ge, 13gf, 13gg) extends entirely across the entire width (13w) of the grinding end. The groove (13ga, 13gb, 13gd, 13ge, 13gf, 13gg) that extends entirely across the entire width (13w) of the grinding end is disposed in said plane (10p) as shown in FIG. 2.

The groove (13ga, 13gb, 13gd, 13ge, 13gf, 13gg) that extends entirely across the entire width (13w) of the grinding end is also disposed in the plane (10p) and has a first portion (13gh) that is disposed at least partially along a first straight line (13sla) and at least partially along a second straight line (13slb) wherein the second line (13slb) is spaced from, but parallel to, the first line (13sla). Both the first (13sla) and second line (13slb) are disposed in the plane (10p).

A centermost portion of the groove (13gd) is disposed along the second line (13slb) closer to the neck (14) than the first portion (13gh) of the groove. The centermost portion of the groove (13dg) has a first wall of a pocket (13p) (FIGS. 1, 9 and 10) formed between a left and right side of the free end (13ep2).

FIGS. 5-8 and 10 show the hard facing material (20), filling the groove (13gl) and covering the edge (13e) with welded hard facing that preferably includes tungsten carbide as at least part of the hard facing material.

Using the grooves (13gl) or pockets of the present invention for hard facing allows for multiple passes of hard-facing with a narrow hammer body for less power consumption. Designed raised edges of hard facing keep hammer sharp for low horsepower start up and improved fine grinding.

Using the elliptical rod hole (12) of the present invention allows for easy clean out of the hole which minimizes hammer sticking and rod wear and allows for faster installation and removal.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

What is claimed is:

1. A hammer comprising:
    a rod hole end having a rod hole disposed therein and wherein said rod hole is configured to engage a hammer mill rod so that the hammer can move about an axis extending through the rod hole;
    a grinding end being spaced from said rod hole end of said hammer, the grinding end having a length, a width, and a thickness defined between a first face and a second face with an edge extending from a first face to a second face, the edge configured to have leading edge portion along the length of the grinding end as the hammer moves about the axis, a following edge portion along the length of the grinding end spaced from the leading edge, and a connecting edge connecting the leading edge to the following edge;

a continuous groove in the edge from the leading edge, along the connecting edge and to the following edge for receiving hard facing material;

a neck connecting said rod hole end and said grinding end;

a plane, disposed transverse to the axis, which plane intersects the groove along the length and width of the groove from the leading edge to the following edge, the plane also intersecting the rod hole; and hard facing disposed in the groove.

2. The hammer of claim 1 wherein the groove in the connecting edge has a first part that is disposed at least partially along a first straight line and at least partially along a second straight line wherein the second line is spaced from, but parallel to, the first line and both the first and second line are disposed in the plane.

3. The hammer of claim 2 wherein an end portion of the groove, is disposed transversely to the straight line of the first part of the groove.

4. The hammer of claim 3 wherein the end portion of the groove includes a centermost portion of the groove, disposed along the second line, the centermost portion being closer to the neck than other parts of the end portion.

5. The hammer of claim 4 wherein the centermost portion of the groove comprises a pocket formed between the leading and following edge portions.

6. The hammer of claim 1 comprising tungsten carbide as at least part of the hard facing.

* * * * *